United States Patent
Coffey et al.

(10) Patent No.: US 8,133,606 B2
(45) Date of Patent: Mar. 13, 2012

(54) BATTERY EMPLOYING AN ELECTRODE PELLET HAVING AN INNER ELECTRODE EMBEDDED THEREIN

(75) Inventors: Brendan Coffey, Austin, TX (US); Charles Sesock, College Station, TX (US)

(73) Assignee: Rechargeable Battery Corporation, College Station, TX (US)

( * ) Notice: Subject to any disclaimer, the term of this patent is extended or adjusted under 35 U.S.C. 154(b) by 0 days.

(21) Appl. No.: 12/413,036

(22) Filed: Mar. 27, 2009

(65) Prior Publication Data

US 2009/0229115 A1 Sep. 17, 2009

Related U.S. Application Data

(62) Division of application No. 10/709,253, filed on Apr. 23, 2004, now abandoned.

(51) Int. Cl.
*H01M 2/00* (2006.01)
*H01M 6/00* (2006.01)
*H01M 10/00* (2006.01)

(52) U.S. Cl. .................. 429/156; 29/623.5; 29/623.1

(58) Field of Classification Search ................. None
See application file for complete search history.

(56) References Cited

U.S. PATENT DOCUMENTS

| | | | |
|---|---|---|---|
| 808,755 A | 1/1906 | Jager | |
| 1,631,528 A | 6/1927 | Hendry | |
| 2,436,382 A | 2/1948 | Deibel et al. | |
| 3,059,041 A | 10/1962 | Vogt | |
| 4,011,103 A | 3/1977 | Kordesch | |
| 4,029,855 A | 6/1977 | Dougherty et al. | |
| 4,215,186 A | 7/1980 | Jaeger | |
| 4,287,273 A | 9/1981 | Harney et al. | |
| 4,292,357 A | 9/1981 | Erisman et al. | |
| 4,327,163 A | 4/1982 | Wheadon | |
| 4,396,691 A | 8/1983 | Wheadon | |
| 4,663,253 A | 5/1987 | Simonton et al. | |
| 4,668,320 A | 5/1987 | Crabtree | |
| 4,680,242 A | 7/1987 | Simonton et al. | |
| 4,761,352 A | 8/1988 | Bakos et al. | |
| 4,788,113 A | 11/1988 | Boehle et al. | |
| 4,957,826 A | 9/1990 | Cheiky | |

(Continued)

FOREIGN PATENT DOCUMENTS

GB   232 802 A   4/1925

*Primary Examiner* — Barbara Gilliam
*Assistant Examiner* — Angela Martin
(74) *Attorney, Agent, or Firm* — Factor Intellectual Property Law Group, Ltd.

(57) ABSTRACT

An electrochemical battery cell comprising a cell housing defining an inner space, a first terminal and a second terminal; and at least one pre-formed pellet disposed within the inner space of the cell housing. The pellet includes an outer electrode portion formed from a material to geometrically define the pellet in a solid form. The outer electrode portion is in electrical communication with the first terminal of the cell housing. The pellet also includes an inner electrode encapsulated by a separator and embedded within the material of the outer electrode portion. The inner electrode is in electrical communication with the second terminal of the cell housing and electrically insulated from the outer electrode material. In a preferred embodiment, the inner electrode comprises an anode and the outer electrode portion comprises a cathode portion. The integrated anode/cathode pellet configuration facilitates lowers costs, a more robust design and ease of manufacturability while maintaining and allowing increased performance characteristics of the battery cell.

5 Claims, 2 Drawing Sheets

U.S. PATENT DOCUMENTS

| | | |
|---|---|---|
| 5,004,655 A | 4/1991 | Symanski |
| 5,075,183 A | 12/1991 | Yamaguchi et al. |
| 5,147,737 A | 9/1992 | Post et al. |
| 5,209,993 A | 5/1993 | Mix |
| 5,230,968 A | 7/1993 | Bones et al. |
| 5,384,211 A | 1/1995 | Choi et al. |
| 5,470,676 A | 11/1995 | Nakano |
| 5,523,183 A | 6/1996 | Koehler et al. |
| 5,558,952 A | 9/1996 | Knauer |
| 5,563,007 A | 10/1996 | Young et al. |
| 5,569,551 A | 10/1996 | Pedicini et al. |
| 5,580,676 A | 12/1996 | Honda et al. |
| 5,616,434 A | 4/1997 | Redden et al. |
| 5,626,989 A | 5/1997 | Doundoulakis |
| 5,635,312 A | 6/1997 | Yanagisawa et al. |
| 5,677,080 A | 10/1997 | Chen |
| 5,716,734 A | 2/1998 | Nakano |
| 5,935,724 A | 8/1999 | Spillman et al. |
| 5,948,561 A | 9/1999 | Urry |
| 5,958,088 A | 9/1999 | Vu et al. |
| 6,001,503 A | 12/1999 | Hercamp et al. |
| 6,037,077 A | 3/2000 | Nowaczyk |
| 6,074,781 A | 6/2000 | Jurca |
| 6,153,335 A | 11/2000 | Vutetakis et al. |
| 6,207,322 B1 | 3/2001 | Kelsey et al. |
| 6,258,473 B1 | 7/2001 | Spillman et al. |
| 6,261,717 B1 | 7/2001 | Luo et al. |
| 6,326,102 B1 | 12/2001 | Getz |
| 6,410,187 B1 | 6/2002 | Luo et al. |
| 6,451,486 B1 | 9/2002 | Davis et al. |
| 6,472,099 B1 * | 10/2002 | Lee et al. ............... 429/206 |
| 6,482,543 B1 | 11/2002 | Shelekhin et al. |
| 6,492,059 B1 | 12/2002 | Hottori et al. |
| 6,514,637 B2 | 2/2003 | Treger et al. |
| 6,521,378 B2 | 2/2003 | Durkot et al. |
| 6,541,140 B1 | 4/2003 | Spillman et al. |
| 6,630,262 B2 | 10/2003 | Yang et al. |
| 2001/0038943 A1 | 11/2001 | Spillman et al. |
| 2001/0041276 A1 | 11/2001 | Yang et al. |
| 2002/0106557 A1 | 8/2002 | Fraser-Bell et al. |
| 2002/0132150 A1 | 9/2002 | Yang et al. |
| 2002/0160263 A1 | 10/2002 | Corrigan et al. |
| 2003/0162089 A1 | 8/2003 | Dreyer et al. |
| 2003/186117 A1 | 10/2003 | Shokoohi et al. |
| 2004/0058234 A1 | 3/2004 | Slezak |

* cited by examiner

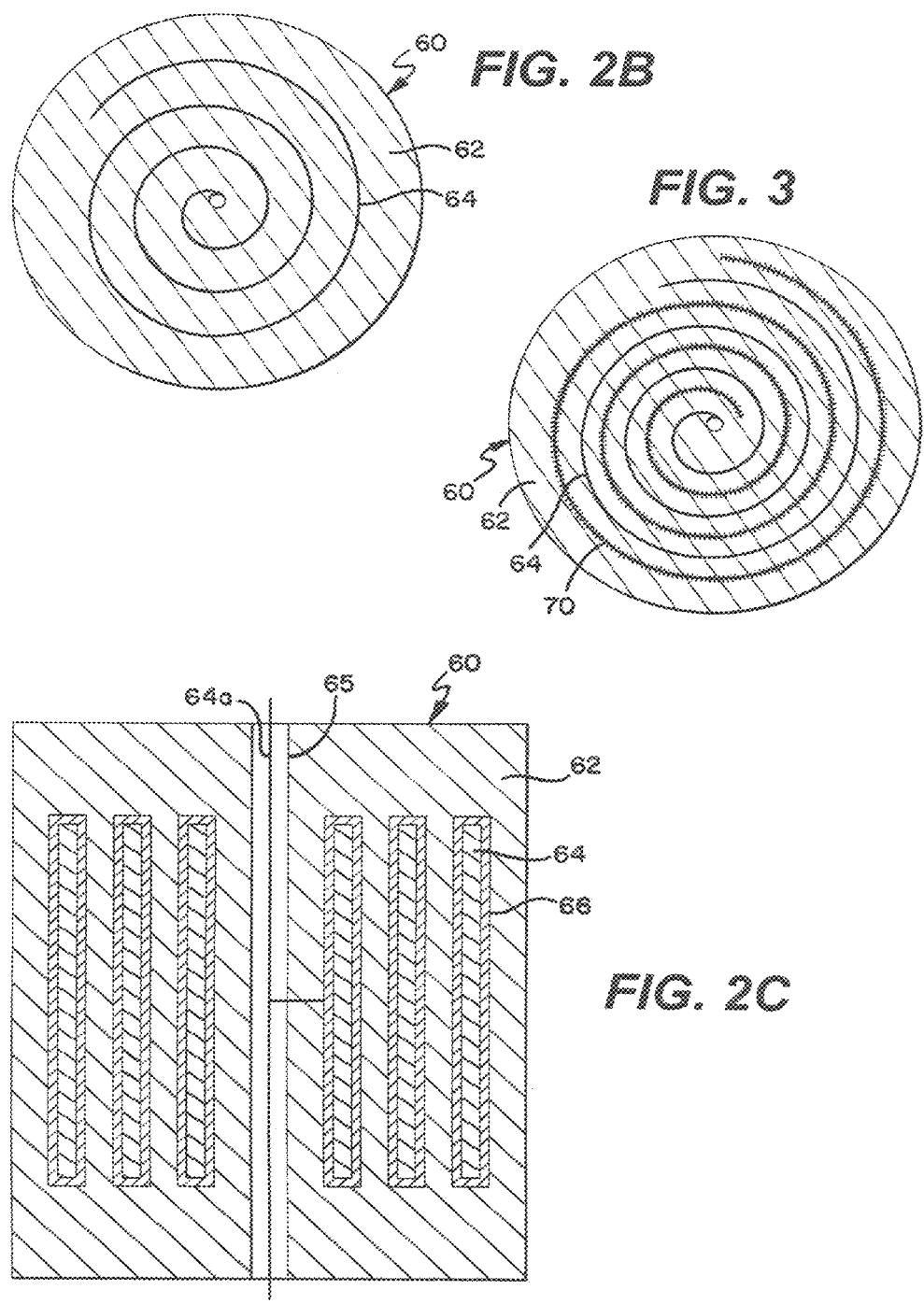

BATTERY EMPLOYING AN ELECTRODE PELLET HAVING AN INNER ELECTRODE EMBEDDED THEREIN

CROSS REFERENCE TO RELATED APPLICATIONS

This application is a divisional of U.S. patent application Ser. No. 10/709,253 filed on Apr. 23, 2004 which claims priority to U.S. Provisional Application No. 60/464,698, filed Apr. 23, 2003, both of which are incorporated herein by reference.

BACKGROUND OF INVENTION

The present invention generally relates to electrochemical battery cells, and more particularly to electrochemical pellet-type battery cells that employ electrode assemblies in the form of pellets.

There are many types and configurations of electrochemical battery cells employed in a variety of applications and in both rechargeable and disposable platforms. The most popular battery cells for consumer applications, particularly high current drain applications, include alkaline cells, nickel metal hydride cells, nickel cadmium cells, and lithium ion cells. As an example, alkaline batteries based on manganese oxide cathodes are widely used for consumer applications. As device power requirements of consumer applications have increased in recent years, alkaline battery producers have sought methods for improving the high drain output of their cells while retaining a simple low cost design and method of assembly. Numerous design strategies have been proposed and implemented to address the requirement of higher capacity utilization at high drain rates.

By way of background and referring to FIG. 1, a typical primary disposable or rechargeable alkaline battery cell configuration is shown in the form of a bobbin cell 10. The cell 10 includes: a cell housing in the form of a steel can 12 defining a cylindrical inner space and interior surface, which can optionally be coated with a conductive coating; a manganese dioxide cathode 14 formed by a plurality of hollow or tubular cylindrical pellets 16 pressed in the can 12; a zinc anode 18 made of an anode gel and arranged within the hollow portion of the cylindrical pellets 16 forming the cathode 14; and a cylindrical separator 20 separating the anode 18 from the cathode 14. The ionic conductivity between the anode and the cathode is facilitated by the presence of an electrolyte, such as potassium hydroxide (KOH), which is added into the cell in a predetermined quantity.

The can 12 is closed at its bottom, and has a central circular pip 22 serving as a positive terminal for the cell. A cell closure assembly hermetically seals a top end of the can 12. The cell closure assembly comprises a negative cap 24 formed by a thin metal sheet, a current collector nail 26 attached to the negative cap 24 and disposed within the anode 18 to provide electrical contact with the anode 18, and a plastic top 28 that electrically insulates the negative cap 24 from the can 12 and separates gas spaces formed beyond the cathode and anode structures, respectively.

As illustrated in FIG. 1, the bottom of the separator 20 is typically sealed by means of a hot-melt bead 34, which is used to seal the separator 20 to a washer 33 in the cell. In another variation, the washer is omitted and only a hot-melt adhesive is used. In yet another variation, a bottom seal cup may be employed without the use of a hot-melt adhesive.

While FIG. 1 illustrates a viable alkaline battery cell configuration, there is a growing need for battery cell configurations having lower costs, more robust design characteristics, and ease of manufacturability while maintaining and continually improving current outputs and other performance parameters. This remains a significant challenge given the current trend of designing consumer electronics with ever increasing power requirements while constantly seeking to reduce product and manufacturing costs to increase profit margins.

The present invention provides an improved battery cell that, among other things, addresses these growing needs.

SUMMARY OF INVENTION

The present invention facilitates integration of an anode and a cathode in a single pellet configuration for use with an electrochemical battery cell of any type or format utilizing one or more pellets. In accordance with the principles of the present invention as embodied and described herein, one particular characterization of the present invention comprises an electrochemical battery cell comprising a cell housing defining an inner space, a first terminal and a second terminal; and at least one pre-formed pellet disposed within the inner space of the cell housing. The pellet includes an outer electrode portion formed from a material to geometrically define the pellet in a solid form. The outer electrode portion is in electrical communication with the first terminal of the cell housing. The pellet also includes an inner electrode encapsulated by a separator and embedded within the material of the outer electrode portion. The inner electrode is in electrical communication with the second terminal of the cell housing and electrically insulated from the outer electrode portion.

Among other things, the integrated inner/outer electrode pellet configuration of the present invention facilitates lowers costs, a more robust design and ease of manufacturability while maintaining and allowing increased performance characteristics of the battery cell. In contrast to prior art cells, such as typical spirally-wound cells, the present invention provides the advantages of a high surface area electrochemical cell wherein the formation of an integrated inner/outer electrode pellet configuration allows for greater tolerances in positioning and alignment of the electrodes with respect to each other while preserving efficient usage of space within the cell housing or container.

According to another aspect of the present invention, the inner electrode comprises a thin and substantially flat structure in a coiled configuration.

According to yet another aspect, the inner electrode includes an electrical lead to facilitate electrical communication with the second terminal of the cell housing.

According to another aspect, in a specific embodiment wherein the battery cell is an alkaline cell, the outer electrode is a cathode of positive polarity and the inner electrode is an anode of negative polarity. In the alkaline battery cell embodiment, the cathode is preferably formed largely from manganese dioxide and the anode is preferably formed largely of zinc.

According to yet another aspect, the anode comprises a material selected from the group consisting of metallic zinc, zinc alloy, zinc oxide and combinations thereof. The material of the cathode portion consists essentially of $MnO_2$; a conductive powder; and an additive selected from the group consisting of a binder, an electrolyte, a recombination catalyst, and combinations thereof.

According to yet another aspect of the present invention, methods of manufacturing a pellet for use with a battery cell and methods of manufacturing a battery cell that utilize one or more pellets are also contemplated. One particular embodiment of a method of manufacturing a pellet for use in an electrochemical battery cell comprises the steps of forming an inner electrode; applying a separator to the inner electrode; embedding the inner electrode into an outer electrode material formulation; and forming the outer electrode material formulation to geometrically define the pellet. One particular embodiment of a method of manufacturing an electrochemical battery cell comprises the steps of forming a battery cell casing including a first terminal and a second terminal; forming an inner electrode; applying a separator to the inner electrode; embedding the inner electrode into an outer electrode material formulation; forming the outer electrode material formulation to geometrically define a pellet; connecting the inner electrode to the second terminal; and disposing the pellet into the battery cell casing such that the outer electrode material formulation is in communication with the first terminal. Yet another embodiment of a method of manufacturing an electrochemical battery cell comprises the steps of: (A) forming a battery cell casing including a first terminal and a second terminal; (B) forming a plurality of pellets, each pellet formed by forming an inner electrode; applying a separator to the inner electrode; embedding the inner electrode into an outer electrode material formulation; and forming the outer electrode material formulation to geometrically define the pellet; (C) connecting each of the inner electrodes to one of either the second terminal or another inner electrode; and (D) disposing the pellets into the battery cell casing such that the outer electrode material formulation of each of the pellets is in communication with the first terminal.

These and other aspects of the present invention will be apparent after consideration of the written description, drawings and claims herein.

BRIEF DESCRIPTION OF DRAWINGS

FIG. 2B is a schematic cross-sectional plan view of the first embodiment of the pellet utilized in the battery cell of FIG. 2A in accordance with the principles of the present invention.

FIG. 2C is a cross-sectional elevational view of the pellet of FIG. 2B.

FIG. 3 is a schematic cross-sectional plan view of a second embodiment of a pellet for use with a battery cell in accordance with the principles of the present invention, wherein a current collector has been added.

DETAILED DESCRIPTION

Figure 1:
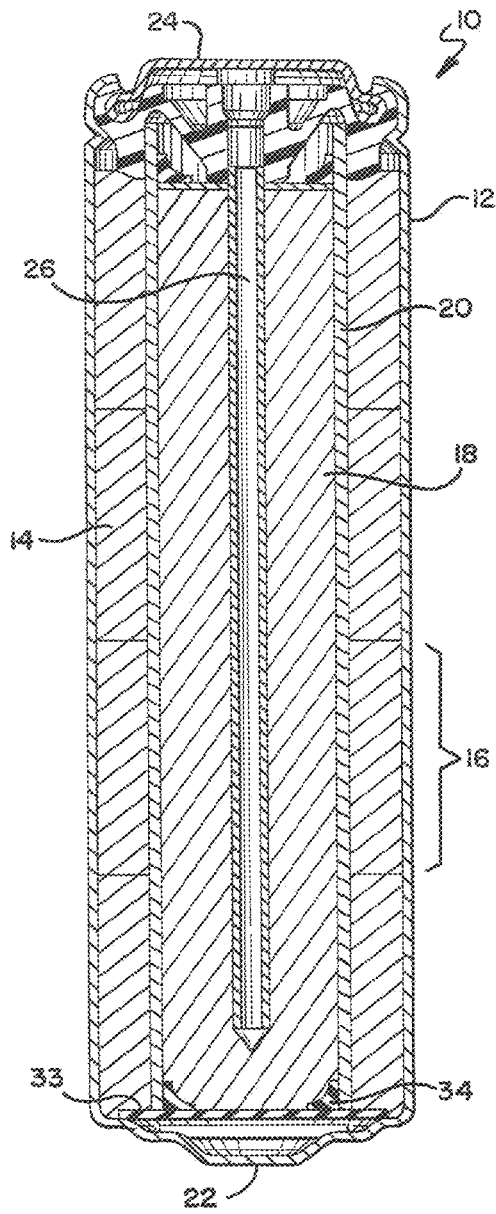
FIG. 1 is a cross-sectional view of a typical cylindrical battery bobbin cell as known in the prior art.

While the present invention is capable of embodiment in many different forms, there is shown in the drawings, and will herein be described in detail, one or more specific embodiments with the understanding that the present disclosure is to be considered an exemplification of the principles of the invention and is not intended to limit the invention to these specific embodiments.

The present invention facilitates integration of an inner electrode, preferably an anode, and an outer electrode, preferably a cathode, into a single pellet configuration for use with an electrochemical battery cell in any type of format utilizing one or more electrode pellets. The pellet configuration can be utilized in any number of battery cell electrochemistry formats, such as, for example, nickel metal hydride (NiMH), lithium ion (Li-ion), nickel cadmium (NiCd), and alkaline cells. Further, the pellet configuration is applicable to any type of battery cell format utilizing one or more pellets, such as, for example, bobbin type cylindrical cells, coin cells or flat plate cells. The integration of the inner and outer electrodes into a single pellet structure that can be inserted into a cell housing or casing, rather than being separately assembled as discrete component materials, facilitates lowers costs, a more robust design and ease of manufacturability, as well as other benefits. Multiple pellets may be used in a single battery cell to achieve a desired cell capacity. The integration of the electrodes in accordance with the principles of the present invention does not adversely affect the performance characteristics of the battery cell.

Figure 2A:
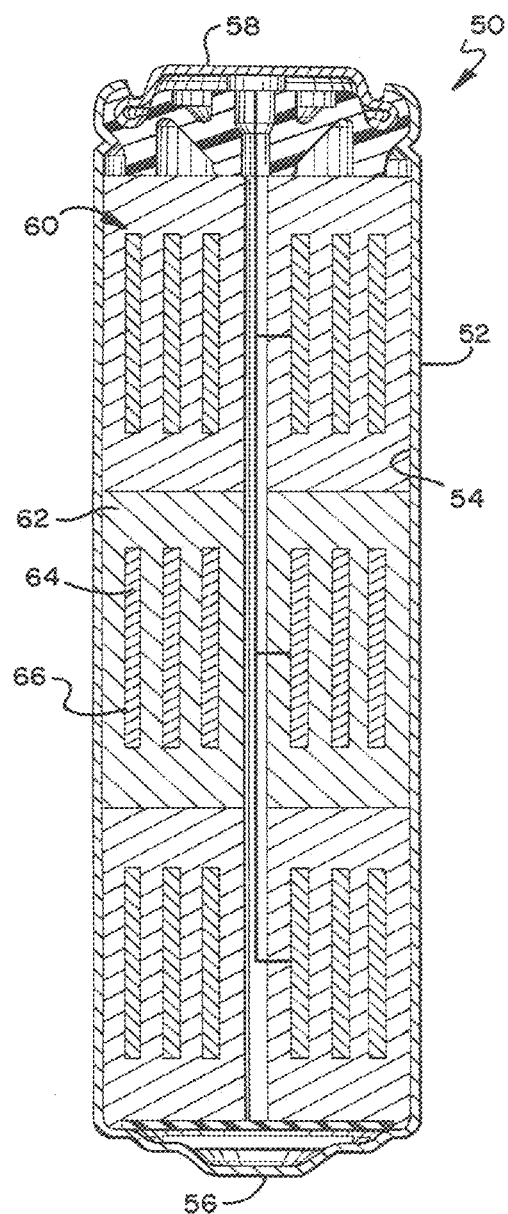
FIG. 2A is a cross-sectional view of a cylindrical battery cell incorporating a first embodiment of a pellet in accordance with the principles of the present invention.

Referring generally now to FIGS. 2A-2C, and particularly to FIG. 2A, one particular characterization of the present invention comprises an electrochemical battery cell 50 having a cell housing 52 defining an inner space 54, a first terminal in the form of a positive terminal 56 and a second terminal in the form of a negative terminal 58. The terminals 56 and 58 can be integrally formed with the housing 52 or connected thereto as a separate component as part of the housing, such as a cap. Further, depending on the particular embodiment, the polarity of each of the terminals 56 and 58 is not limited to one of either a positive or negative polarity. The battery cell 50 includes at least one pre-formed pellet 60 disposed within the inner space 54 of the cell housing 52. As best shown in FIGS. 2B and 2C, the pellet 60 includes an outer electrode in the form of a cathode portion 62, which is formed from a cathode material formulation that, when formed, geometrically defines the pellet. The material formulation can be of any type typically utilized to form cathode pellets and known in the art. In a preferred embodiment, the material formulation of the cathode portion consists essentially of electrolytic $MnO_2$ (EMD), a conductive powder, and one or more additives, such as, for example, a binder, an electrolyte, a recombination catalyst, or one or more combinations thereof. The pellet 60 also includes an inner electrode in the form of an anode 64 embedded within the cathode portion 62. It should be understood that in all of the embodiments described herein, both the inner electrode and the outer electrode may be configured as either an anode or a cathode, depending on the particular application. The cathode portion 62 is in electrical communication with the positive terminal 56 of the cell housing. In the embodiment shown in FIG. 2A, the electrical communication is established by contact between the cathode portion 62 and an inner surface of the cell housing 52, which is ultimately in electrical communication with the positive terminal 56. The anode 64 is in electrical communication with the negative terminal 58 of the battery cell 50 and electrically insulated from the cathode material. In configurations utilizing a plurality of pellets, such as that shown in FIG. 2A, each of the anodes 64 is either in direct electrical contact with another anode 64 or the negative terminal 58 of the battery cell 50. Electrical connection of the anodes 64 is facilitated by an electrical lead 64a, such as a wire, tab, terminal, extension of the anode, or the like. In the embodiment shown in the figures, the pellets 60 include a thru-hole 65 to facilitate electrical connections between the anodes 64 of the pellets 60. Other electrical connection schemes known in the art are contemplated as well.

Prior to formation of the cathode portion 62 from the cathode material, the anode 64 embedded within the material. Formation of the cathode portion 62 may be facilitated by a number of formation techniques and means, such as, for example, compression formation, molding, casting, extruding, or the like. As shown in the embodiment depicted in FIG. 2B, the anode 64 is a thin and substantially flat or plate-like structure in a coiled configuration. However, other types of configurations or shapes may be utilized, particularly configurations that maximize surface area of the anode 64.

The anode 64 is encapsulated by a separator 66. The separator 66 comprises a laminated or composite material typically used as a separator material. In a preferred embodiment, the separator 66 comprises a combination of an absorbent fibrous sheet material wettable by an electrolyte and an insulating material that is impermeable to small particles while being permeable to ions. The absorbent material is preferably a macro-porous structure, such as a non-woven polyamide. Shorting is prevented by the insulating material, which may comprise one or more layers of a micro-porous or non-porous material laminated to or coated onto the absorbent fibrous sheet material. As an example, the insulating material may comprise one or more cellophane membranes laminated onto a non-woven polyamide sheet. Another example of an insulating material is one or more coatings of regenerated cellulose or viscose coated onto and partially impregnating the non-woven polyamide sheet, resulting in a composite material. Another suitable coating comprises a polymeric material such as sulfonated polyphenylene oxide and its derivatives. One or more layers of the laminated or composite material are preferably wound or coiled to form a spiral-like or coiled structure as shown in the figures.

In addition to the embedded anode 64, a coiled current collector 70 may be embedded into the cathode portion of the pellet, as shown in FIG. 3. The current collector 70 facilitates additional current collection for the cathode portion 62. Preferably, the current collector 70 is a nickel mesh-like material and is incorporated into the cathode portion 62 of the pellet 60.

With the understanding provided by the above description, methods of manufacturing a pellet and methods of manufacturing a battery cell that utilize one or more pellets in accordance with the principles of the present invention will now be described.

In a particular embodiment, a method of manufacturing a pellet for use in an electrochemical battery cell is provided in accordance with the principles of the present invention. The method comprises the steps of: (A) forming an inner electrode, such as an anode, preferably in a configuration having a large surface area; (B) applying a separator to the inner electrode; (C) embedding the inner electrode into an outer electrode material formulation, such as a cathode material formulation; and (D) forming the outer electrode material formulation to geometrically define the pellet.

In another embodiment, a method of manufacturing an electrochemical battery cell utilizing at least one pellet is provided in accordance with the principles of the present invention. The method comprises the steps of: (A) forming a battery cell casing including a first terminal, preferably of positive polarity, and a second terminal, preferably of negative polarity; (B) forming an inner electrode, preferably an anode and in a configuration having a large surface area; (C) applying a separator to the inner electrode; (D) embedding the inner electrode into an outer electrode material formulation, preferably a cathode material formulation; (E) forming the outer electrode material formulation to geometrically define a pellet; (F) connecting the inner electrode to the second terminal; and (G) disposing the pellet into the battery cell casing such that the outer electrode material formulation is in communication with the first terminal.

Yet another embodiment of a method of manufacturing an electrochemical battery cell in accordance with the principles of the present invention comprises the steps of: (A) forming a battery cell casing including a first terminal, preferably a positive terminal, and a second terminal, preferably a negative terminal; (B) forming a plurality of pellets, each pellet formed by: forming an inner electrode, preferably an anode in a configuration having a large surface area; applying a separator to the inner electrode; embedding the inner electrode into an outer electrode material formulation, preferably a cathode material formulation; and forming the outer electrode material formulation to geometrically define the pellet; (C) connecting each of the inner electrodes to one of either the second terminal or another inner electrode; and (D) disposing the pellets into the battery cell casing such that the outer electrode material formulation of each of the pellets is in communication with the first terminal.

Other aspects may be included in these methods consistent with the description herein. For example, the step of forming the inner electrode may comprise coiling the inner electrode into a spiral-like configuration; the step of forming the outer electrode material formulation may comprise molding the material formulation to geometrically define the pellet; the step of applying the separator to the inner electrode may comprise coating the inner electrode with an adherent and flexible microporous separator material; or the step of forming the outer electrode material formulation may comprise compression-forming the material formulation to geometrically define the pellet.

Further steps may be included in the above-described methods in accordance with the description herein, such as including a step of attaching an insulated electrical lead to the inner electrode before it is embedded into the outer electrode material formulation; a step of blending electrolytic $MnO_2$, conductive powder, and an additive to create the outer electrode material formulation; or a step of embedding a current collector into the outer electrode material formulation.

To help illustrate the principles of the present invention and to assist those skilled in the art to better understand the invention and its principles and advantages, the following example is provided, which provides more detail regarding some of the preferred embodiments of the present invention. It is to be understood, however, that this example is intended to be illustrative of the invention and not limiting to the scope thereof.

EXAMPLE

This example specifies some details concerning an embodiment of the present invention in the form of an alkaline manganese dioxide cell. In this particular example, each alkaline cell contains three cathode/anode pellets, such as the three pellets 60 shown in the cell 50 in FIG. 2A. The outer electrode material portion of each pellet, which in this example is a cathode material portion, is approximately 3.4 g. The cathode material formulation is a Type I formulation typical of primary alkaline cells and consists of 88 wt % EMD ($MnO_2$), 7.5 wt % conductive powder, and the remainder being other additives such as binders, electrolyte, and recombination catalyst. The components of the cathode material formulation are blended and an inner electrode in the form of an anode is embedded therein. The material formulation is then pressed into a pellet geometry. Sufficient zinc weight (approx. 1 g) should be present in the anode to match the cathode capacity per pellet. The anode is pre-formed, preferably with a solid density of 4-5 g/cm3 of dry thin flexible charge zinc structures coated onto an absorber and/or a thin flexible metal mesh current collector. Suitable formulation ingredients for the anode include Zn powder in a range of particle sizes, a composite including Zn fibers to give good electrical conductivity throughout the composite, polymers such as ground KC32 or other absorber material, nylon, PP, or Kraton®. Suitable processing methods for the anode formulation include pasting, melt processing, roll milling, pasting impregnated absorber or expanded metal such as Exmet®, pressing the formulation onto the absorber or expanded metal. Pressing dry PgelSize should be about 80% of pellet height, length 1.5 2 inches and thickness 30-60 mils. Anodes should be semi-solid, rigid to hold their shape once formed, but not so brittle that they crack on bending or compressing. Dimensions should be reasonably controlled but anodes should absorb electrolyte with moderate swelling. An insulated wire can be attached to the metal substrate in the anode to facilitate electrical connections. Other means of making electrical connections to the embedded anode may also be devised, such as, for example, an electrical lead integrally formed with the anode and allowed to extend outwardly during formation of the pellet. The formed anode is encapsulated by a separator coating before being embedded in the pellet. The separator coating in this example is "starch," which could further include suspended TiO2 powder. The anode is preferably dried after coating. Alternatively, the anode may be wrapped with a flexible separator material made from polytetrafluoroethylene (PTFE), such as that manufactured by W.L. Gore and Associates, Inc. under the trade name Excellerator®, or other suitable separator materials, such as separators manufactured by Advanced Membrane Systems, Inc under the trade name FAS™, or the like.

Either before or after applying the separator the anode is preferably loosely coiled in a spiral-like configuration and embedded in the cathode material formulation in such a way as to ensure that there is not excessive deformation of the anode coil and shorting during forming of the cathode material into the pellet form. A cathode current collector may optionally be embedded alongside the coiled anode or integrated therewith so as to be embedded by virtue of the anode being embedded.

Cells of each of the various types may be subjected to a cyclic electrical test regimen consisting of discharge at 1 Amp to 1 volt, and in the case of rechargeable forms of cells, followed by taper charging at 1.75 Volts for 12 hours with a 500 mA current limit.

In this example, an alkaline manganese dioxide cell incorporating a relatively high surface area anode structure is embedded within the cathode material of the cathode portion when it is formed to geometrically define the pellet. The anode structure is flexible so that it may be coiled within the pellet mold prior to pressing and may be deformed during pressing without breaking. In this embodiment, the anode structure consists of a composite mixture of zinc powder and or fiber, polymer binders, absorbers and other additives overlaying a thin metal foil or mesh current collector, which may be copper or brass. The anode structure is coated with a separator layer that is also flexible so that it does not crack or tear away from the anode surface in the pellet molding process. The separator coating is suitably microporous to allow good ion transport between the anode and cathode while not permitting short circuit contact between the two electrodes either before or subsequent to the pressing operation. A parallel cathode current collector may also be embedded in the pellet to improve electron transfer to the cathode. A wire, lead, or tab connection can be bonded to the anode structure prior to pellet formation and brought outside the pellet during or after formation. The wire, lead or tab connection facilitates connection to the negative contact of the can or cell housing. By thus increasing the anode to cathode interfacial area and thinning the anode structure relative to a conventional bobbin cell design, better material utilization is realized and the cell can deliver more runtime at higher drain rates.

In a preferred embodiment, an alkaline manganese dioxide-zinc cell is provided comprising a manganese dioxide cathode, a zinc anode, a separator between the anode and cathode, and an aqueous alkaline potassium hydroxide electrolyte. The anode comprises a zinc component, an absorber, a polymer and other additives formed into a high surface area form and coated with a well adherent and flexible microporous separator. The anode is coiled and placed into a pellet mold wherein the cathode material formulation is added as a powder and the entire mass pressed into a pellet. The pellet can then be disposed in a cell housing or casing, such as a can of the typical bobbin type cylindrical cell. If necessary, leads or wires are brought out from the anode structure and connected to the negative can terminal. Additional electrolyte may be added and the anode may undergo some volume changes. However throughout these processing steps the separator coating retains a suitable microporous characteristic to prevent zinc dendrites and shorting between the anode and the cathode.

While specific embodiments have been illustrated and described herein, numerous modifications may come to mind without significantly departing from the spirit of the invention, and the scope of protection is only limited by the scope of the accompanying Claims.

What is claimed is:

1. A method of manufacturing an electrochemical battery cell, the method comprising the steps of:
   providing a battery cell casing having an inner volume and a first terminal and a second terminal;
   forming an integrated pellet configuration having at least two pellets and further comprising the steps of:
   for each pellet: providing an inner electrode and a separator for that inner electrode;
      then embedding the inner electrode into an outer electrode material formulation;
      then forming the outer electrode material formulation to geometrically define the shape of the pellet; and,
      then connecting the inner electrodes of the pellets in the integrated pellet configuration to the second terminal; and,
   then disposing the integrated pellet configuration into the battery cell casing inner volume.

2. The method of claim 1 wherein the inner electrode comprises an anode and the outer electrode material comprises a cathode.

3. The method of claim 1 further comprising the step of attaching an insulated electrical lead to the inner electrode before it is embedded into the outer electrode material formulation to facilitate connection to the second terminal.

4. The method of claim 1 wherein the shape of the pellet and the inner housing are substantially the same.

5. The method of claim 1 wherein the inner electrode has a spiral configuration.

* * * * *